United States Patent
Kumar et al.

(10) Patent No.: US 11,157,533 B2
(45) Date of Patent: Oct. 26, 2021

(54) DESIGNING CONVERSATIONAL SYSTEMS DRIVEN BY A SEMANTIC NETWORK WITH A LIBRARY OF TEMPLATED QUERY OPERATORS

(71) Applicant: INTERNATIONAL BUSINESS MACHINES CORPORATION, Armonk, NY (US)

(72) Inventors: Pratyush Kumar, Guindy (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 15/806,695

(22) Filed: Nov. 8, 2017

(65) Prior Publication Data

US 2019/0138647 A1 May 9, 2019

(51) Int. Cl.
*G06F 16/00* (2019.01)
*G06F 16/33* (2019.01)
*G10L 13/00* (2006.01)
*G06F 16/338* (2019.01)
*G06F 16/332* (2019.01)
*G06N 5/00* (2006.01)
(Continued)

(52) U.S. Cl.
CPC ........ *G06F 16/3344* (2019.01); *G06F 16/338* (2019.01); *G06F 16/3329* (2019.01); *G06F 40/30* (2020.01); *G06F 40/35* (2020.01); *G06N 5/00* (2013.01); *G10L 13/00* (2013.01)

(58) Field of Classification Search
CPC .. G06F 16/00; G06F 16/3344; G06F 16/3329; G06F 16/338
See application file for complete search history.

(56) References Cited

U.S. PATENT DOCUMENTS

| | | |
|---|---|---|
| 2006/0149553 A1 | 7/2006 | Begeja et al. |
| 2014/0006012 A1* | 1/2014 | Zhou ................ G06F 16/3329 704/9 |
| 2014/0019116 A1 | 1/2014 | Lundberg et al. |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.

*Primary Examiner* — Khanh B Pham
(74) *Attorney, Agent, or Firm* — Michael O'Keefe

(57) ABSTRACT

A method, computer system, and computer program product for a conversational system driven by a semantic network with a library of templated query operators are provided. The embodiment may include loading one or more operators for the conversational system to the library of templated query operators. The embodiment may also include receiving a query statement from a user. The embodiment may further include identifying an operator from the library to process the received query. The embodiment may also include identifying one or more input terms for the identified operator within the received query. The embodiment may further include generating one or more output terms based on processing the one or more identified input terms using the identified operator. The embodiment may also include generating a natural language response to the received query based on the one or more generated output terms.

20 Claims, 6 Drawing Sheets

(51) Int. Cl.
*G06F 40/30* (2020.01)
*G06F 40/35* (2020.01)

(56) References Cited

U.S. PATENT DOCUMENTS

| | | |
|---|---|---|
| 2016/0203125 A1 | 7/2016 | Sarikaya et al. |
| 2016/0247068 A1* | 8/2016 | Lin ......................... G06F 17/28 |
| 2017/0177675 A1* | 6/2017 | Beller ............... G06F 16/90332 |
| 2017/0177715 A1* | 6/2017 | Chang .................. G06F 40/186 |
| 2017/0270120 A1* | 9/2017 | Ajmera ............... G06F 16/3338 |
| 2019/0243900 A1* | 8/2019 | Gan ........................ G06F 16/00 |

* cited by examiner

DESIGNING CONVERSATIONAL SYSTEMS DRIVEN BY A SEMANTIC NETWORK WITH A LIBRARY OF TEMPLATED QUERY OPERATORS

BACKGROUND

The present invention relates, generally, to the field of computing, and more particularly to conversational systems.

Conversational systems relate to software programs capable of receiving and analyzing human speech to perform an action and returning a response in a coherent structure. Some conversational systems integrate various speech recognition, natural language processing, and dialog understanding technologies to perform necessary tasks. Some typical uses of conversational systems include virtual assistants, customer care systems, and the Internet of Things.

SUMMARY

According to one embodiment, a method, computer system, and computer program product for a conversational system driven by a semantic network with a library of templated query operators are provided. The embodiment may include loading one or more operators for the conversational system to the library of templated query operators. The embodiment may also include receiving a query statement from a user. The embodiment may further include identifying an operator from the library to process the received query. The embodiment may also include identifying one or more input terms for the identified operator within the received query. The embodiment may further include generating one or more output terms based on processing the one or more identified input terms using the identified operator. The embodiment may also include generating a natural language response to the received query based on the one or more generated output terms.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
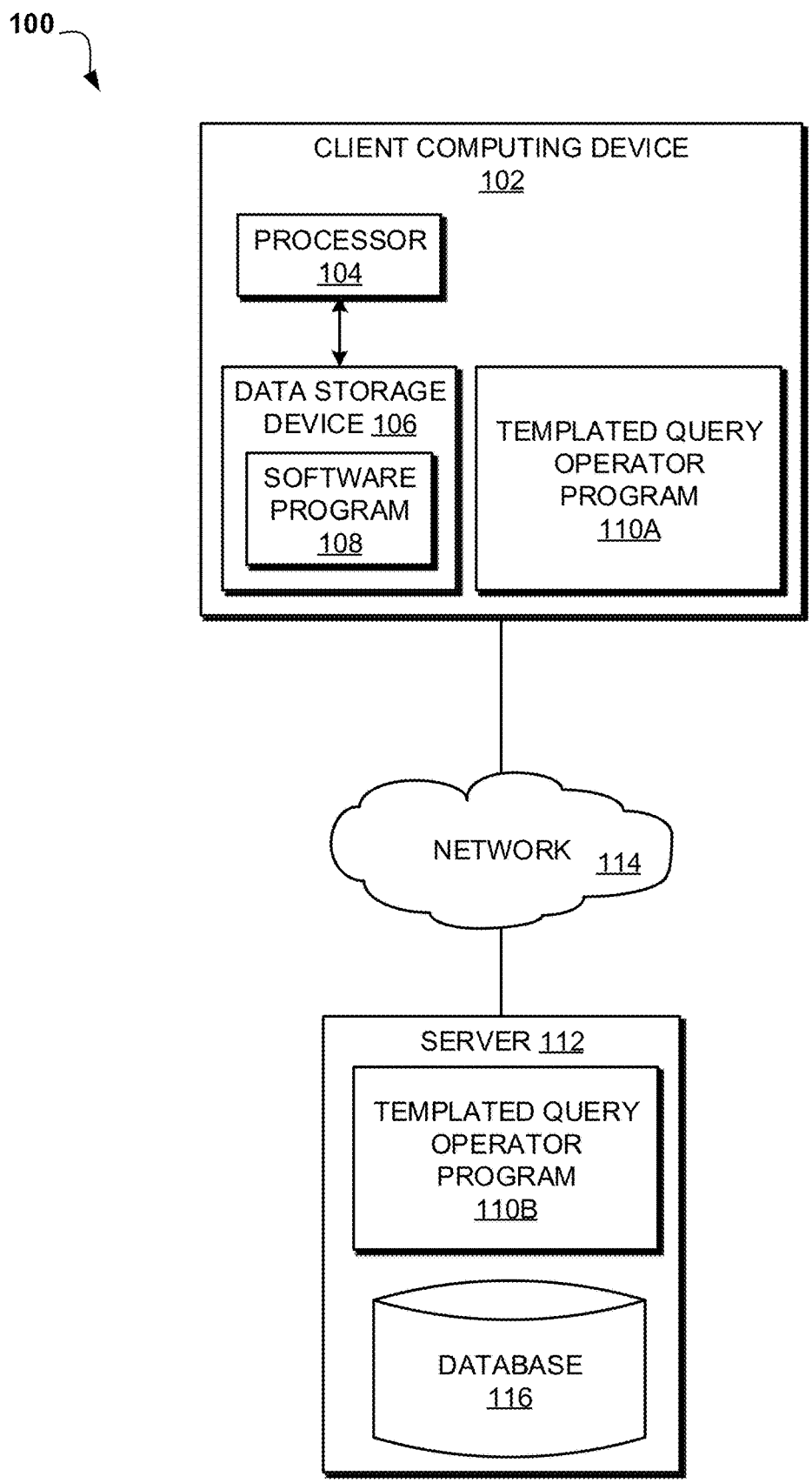
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to conversational systems. The following described exemplary embodiments provide a system, method, and program product to, among other things, utilize a library of templated query operators to convert a natural language input to a query on a semantic network. Therefore, the present embodiment has the capacity to improve the technical field of conversational systems by reducing resources and increasing efficiency during the process of developing a conversational system.

As previously described, conversational systems relate to software programs capable of receiving and analyzing human speech to perform an action and returning a response in a coherent structure. Some conversational systems integrate various speech recognition, natural language processing, and dialog understanding technologies to perform necessary tasks. Some typical uses of conversational systems include virtual assistants, customer care systems, and the Internet of Things.

Platforms to design conversational systems are becoming more prevalent quickly in the developer environment. A crucial technical challenge in the development of conversational systems is to partition the development effort between horizontal platform features and vertical solution features. For example, natural language understanding and natural language generation may each be mostly a platform feature configured for a solution whereas dialogue scripting may be mostly a solution feature requiring templating dialog specific to a solution.

A semantic network represents knowledge as a network that relates concepts with semantic relations. A semantic network may be used when an individual possesses knowledge of related concepts. For example, in the sentences "A whale is a mammal" and "A whale live in water", the word "whale" may be semantically related to both the words "mammal" and "water" in a network. However, the words "water" and "mammal" may not be connected since there is not related concept directly connecting the two words. Many semantic networks are cognitively-based in that some sense of rationale may be needed to connect relations to each other.

For a conversational system, a semantic network may function as both a memory store to remember all known facts as well as a reasoning on known facts. Conversational systems driven by semantic networks may have a number of useful advantages. For example, semantic network-driven conversational systems may partially decouple the design of the conversational frontend from the backend of curating and normalizing data that populates the semantic network. Similarly, conversational systems driven by semantic networks may improve performance capabilities by simply upgrading the semantic network. Additionally, such systems may greatly generalize the class of possible conversations. As such, it may be advantageous to, among other things, provide a library of templated query operators which enable complex natural language-based interactions between a user and a semantic network representing the knowledge of the conversational system.

According to one embodiment, a set of operators may be imported from a library for a conversational system. When a natural language input is received from a user into a conversational system, a natural language classifier may be implemented that is capable of identifying the specific operator loaded from the library appropriate to process the natural language input. A natural language understanding module may then be utilized to collect the input variables required for the identified operator based on the ontology of the semantic networks. A query translator may convert the input for the operator to a specific query for the data store format of the semantic network. Once the query is processed by the imported operator, a natural language generation module may generate a natural language output to present to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to implement a library of templated query operators in a semantically-driven conversational system.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a templated query operator program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a templated query operator program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the templated query operator program 110A, 110B may be a program capable of importing an operator from a library based on user query terms. The templated query operator program 110A, 110B may also be capable processing the query terms required for the imported operator to properly execute the query search, and generate a natural language response to be presented to a user. The templated query operator program 110A, 110B may utilize an intent classifier, an input collector, and a natural language generator to complete each step. The templated query operator method is explained in further detail below with respect to FIG. 2.

Figure 2:
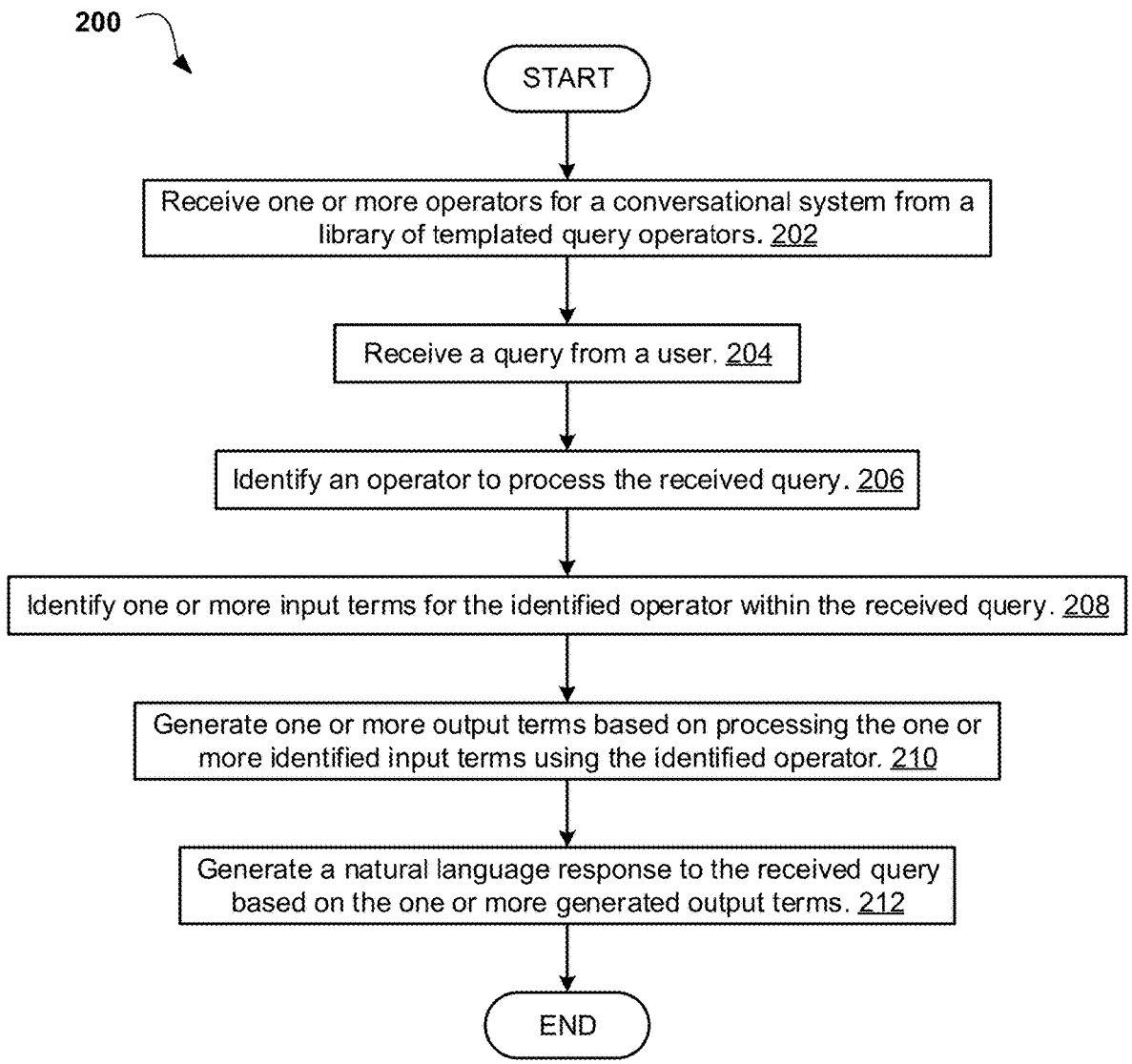
FIG. 2 is an operational flowchart illustrating a templated query operator process according to at least one embodiment.

FIG. 2 is an operational flowchart illustrating a templated query operator process 200 according to at least one embodiment. At 202, the templated query operator program 110A, 110B loading one or more operators for a conversational system to a library of templated query operators. The library of templated operators may be expected to capture some of the common motifs in conversational turns involving querying knowledge bases. There may be various categories of operators that are trained to handle different use cases, such as informational and process operators, problem solving operators, and recommending operators. Informational and process operators may identify facts or documents that match a given set of features, such as a topical question operator and a hint operator discussed in more detail below. Inputs for information and process operators may be a set of constrains given as relations and/or relation-concept tuples and outputs for these operators may be a set of concepts which satisfy the constraints. Problem solving operators may invoke a root-cause analysis which, given a set of inferred symptoms, identifies a common explanation. Problem solving operators may have cross-cutting applications in bots for tech support and medical assistance, such as a common relations operator, discussed in more detail below. Recommending operators may be capable of recommending a product or service given specific user preferences, such as a recommender operator discussed in more detail below.

The topical question operator may be a topical question operator that can generate questions in an automated education bot. Each generated question can be personalized to the user and can also be refashioned for other bots. The topical question operator may receive as inputs a relation r, a relation-concept pair (s,A), and a set of annotations while providing as an output a fact tuple (X,r,Z) satisfying (Z,s,A) and annotations. For example, the topical question operator may receive, as an input, the natural language sentence "Ask an unanswered question on the capital of a country in Europe" from a user. The input values may be: relation r=capital, relation-concept pair (country_in, Europe), and annotations "asked=no". Therefore, the topical question operator may output the function:

{(Paris,capital,France), asked=no}

(France,country_in,Europe)

which may result in a natural language response provided to the user of "What is the capital of France?".

The hint operator may be used as an educational bot to provide a hint to a given question. The provided hint may be specialized to the topic of the question, and can be personalized to the information already known by the user. The hint operator may received as inputs a fact tuple=(A,r,B), a question concept=A, and annotations={(Ann1:Ann1Val, Ann2:Ann2Val, . . . )} while providing as an output a tuple (A,s,C) satisfying all input annotations. For example, when a conversational system is engaging a user and has asked the question "What is the capital of France?", the user may respond with the phrase "Show me a hint", which may be used as the input phrase for the hint operator. The hint operator may identify the input values of:

{(Paris, capital,France), "Difficulty:Easy", "Topic: Geography, Politics", "Asked:No"}
Annotations={Topic: Geography,Answered:Yes}

Therefore, the hint operator may output the function:

{(Seine,flows through, Paris), "Topic:Geography", "Asked:Yes", "Answered:Yes"} which may result in a natural language response provided to the user of "Here is a hint based on an earlier question you answered: Seine flows through this.".

The recommender operator may recommend a product or service to a user based on a given set of features, and can be configured to include additional features based on the commercial intent. The recommender operator may receive as inputs a set of relation-concept tuples={(p,A), (q,B), (r,C), . . . } and a relation r and a concept Y while providing an output of a fact tuple (X,r,Z) satisfying (Z,*,Y). For example, the recommender operator may receive from a user the natural language statement "Show me holiday in beach destination that are cheap". The recommender operator may identify the input values of:

{(located_in,Beach),(price, law)}

Relation r="combo_deal". Concept Y="flight"

Therefore, the recommender operator may output the function:

Bali {(Bali,located_in,Beach),(Bali,price,Low)}

{(Bali, combo_deal,IndonesianAirlines)}

{(IndonesianAirlines,is,flight)} which may result in a natural language response provided to the user of "You should go to Bali. We have a combo deal with Indonesian Airlines.".

The common relations operator may be used in a conversational commerce bot to classify user preferences. Additionally, the common relations operator may be used in a cognitive finance application to ask questions on common features of companies, deal, or transactions. The common relations operator may receive as inputs a set of concepts {A,B,C, . . . } and return as outputs relation-concept pairs (r,Z) that each satify (A,r,Z), (B,r,Z), (C,r,Z), . . . sets. For example, in response to a conversational system asking the user "Which phones did you own?" and the user responding "Note 2®, Note 4®, and Nexus 6p®" (Galaxy Note 2, Galaxy Note 4 and all Galaxy-based trademarks and logos are trademarks or registered trademarks of Samsung Electronics and/or its affiliates) (Nexus 6P and all Nexus-based trademarks and logos are trademarks or registered trademarks of Google Inc. and/or its affiliates), the common relations operator may identify as inputs {Note2,Note4, Nexus6P}. Therefore, the common relations operator may output the function:

(running_on,Android)

(screen_size,large)

Which may result in a natural language response provided to the user of "Looks like you like phones running on an Android® operating system and with screen sizes that are large. Shall I show you more such phones?" (Android and all Android-based trademarks and logos are trademarks or registered trademarks of Google Inc. and/or its affiliates).

Each operator added to the library may have a corresponding semantic network query module that can consume a semantic network with an ontology of concepts and relations, and convert a natural language query with annotations of semantic roles to a data-store dependent query and return valid results. When added to the library, the templated query operator program 110A, 110B may require various criteria, such as the interface of operators (e.g., inputs and outputs), a list of example trigger phrases that may invoke the operator by an intent classifier, example operator entity mappings (i.e., user text to operator inputs) to train the input collector, and examples of natural language generation from the output.

Each input for an operator may have two attributes: a source and a type. The source may be a user input, a context, or a configuration. The type may be an annotation or a tuple involving concepts and relations, such as "concept", "relation", "concept,relation", "concept, relation,concept", etc. Each output for an operator may have a tuple involving concepts and relations, such as "concept", "relation", "concept,relation", "concept, relation,concept", etc.

The query operators may form a subset of conversations in which the user can engage. The intent classifier may classify which user input classify as invocation for a specific query operator. For example, a question operator may have trigger phrases of "ask me a question on . . . ", "quiz me on . . . ", and "test me about . . . ". A platform developer may be required to identify examples of trigger phrases for the intent classifier to properly operate. In at least one embodiment, the templated query operator program 110A, 110B may utilize machine learning to identify trigger phrases not established by a platform developer during import of an operator.

Then, at 204, the templated query operator program 110A, 110B receive a query from a user. During an exchange with a conversational system, a user may ask a natural language query to or make a statement to the conversational system, such as "Where can I purchase shoes near me?" or "Show my inexpensive travel destinations".

Next, at 206, the templated query operator program 110A, 110B identifies an operator to process the received query. Once a query is received, the templated query operator program 110A, 110B may analyze the received query to identify an appropriate operator capable of processing the query and returning accurate results. To properly identify a corresponding operator, the templated query operator program 110A, 110B may utilize an intent classifier that may be capable of determine user intent in the receive query statement by applying natural language processing techniques, such as semantic analysis. For example, the templated query operator program 110A, 110B, implementing the intent classifier, may determine the user query of "Ask an unanswered question on a capital of a country is Europe." is asking for a question to be generated and presented to the user that relates to a European capital. Therefore, the templated query operator program 110A, 110B may determine a topical question operator is most appropriate in handling the received query based on the determined user intent.

Then, at 208, the templated query operator program 110A, 110B identifies one or more input terms for the identified operator within the received query. When establishing each operator, a platform developer may be required to provide examples that map entities in the user text to the inputs expected in the operator interface. By performing supervised training, the conversation system may be capable of learning a model to map for a new user input. For example, if an interface has a relation r, a relation-concept pair (s,A), and a set of annotations established as inputs and a user inputs statement of "Ask an unanswered question on a capital of a country in Europe", the templated query operator program 110A, 110B, using a semantic query module, may identify "question" as a concept, "unanswered" as an annotation, "capital of" as a relation, "country in" as a relation, and "Europe" as a concept. Therefore, the mapping of each identification to the interface may be performed by the developer as relation r is "capital of", relation-concept pair (s,A) is ("country in", "Europe"), and the annotation set is "unanswered".

In at least one embodiment, the templated query operator program 110A, 110B may utilize an input collector to identify the input terms from the received query. The input collector may provide rules and be capable of natural language understanding to collect the required input terms for a specific operator from the input text. The type of input collected utilized by the templated query operator program 110A, 110B may depend on the ontology behind the semantic network.

Next, at 210, the templated query operator program 110A, 110B generates one or more output terms based on processing the one or more identified input terms using the identified operator. Once the input terms are identified, the templated query operator program 110A, 110B may use the input terms within the identified operator to generate one or more output terms. For example, in the previous example where the user input terms were identified as relation r being "capital of", relation-concept pair (s,A) being ("country in", "Europe"), and the annotation set being "unanswered" for the user query statement "Ask an unanswered question on a capital of a country in Europe.", the templated query operator program 110A, 110B utilizing the semantic network-driven conversational system may produce the output terms (Paris, capital,France).

Then, at 212, the templated query operator program 110A, 110B generates a natural language response for the received query based on the one or more generated output terms. Using a natural language generator, the templated query operator program 110A, 110B may analyze the output terms to generate a natural language response for the user. For example, if the output terms in the previous example are (Paris,capital,France) for the initial user query statement of "Ask an unanswered question on a capital of a country in Europe.", the templated query operator program 110A, 110B, utilizing a natural language generator, may produce the natural language response "What is the capital of France?". The natural language generator may provide rules to generate natural language text from the output terms generated by running the query of the identified operator.

In at least one embodiment, the templated query operator program 110A, 110B may transmit the natural language response to a graphical user interface of a client computing device 102 to allow the user to view the natural language response. In at least one other embodiment, the templated query operator program 110A, 110B may present the natural language response to the user as a human voice through a speaker using natural language processing techniques, such as text-to-speech software.

Figure 3:
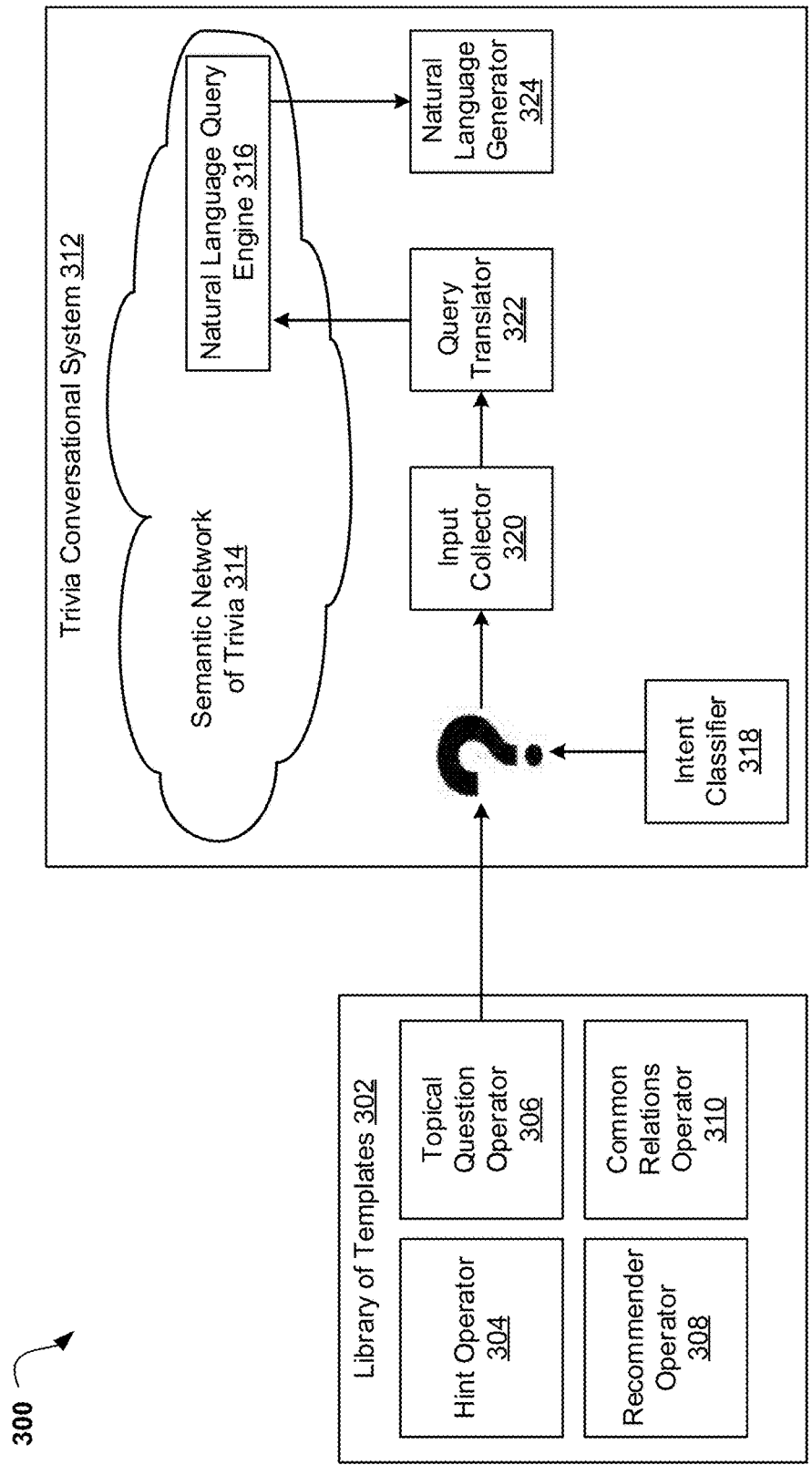
FIG. 3 is a functional block diagram of utilizing templated query operators in a conversational system according to at least one embodiment.

Referring now to FIG. 3, a functional block diagram 300 of utilizing templated query operators in a conversational system is depicted, according to at least one embodiment. A library of templates 302 may contain a group of operators, such as hint operator 304, topical question operator 306, recommender operator 308, and common relations operator 310. When a user engages with a trivia conversational system 312 that is driven by a semantic network of trivia 314, the user may pose a query statement to the trivia conversational system 312. The question may be analyzed by an intent classifier 318 and, based on preconfigured trigger phrases, the intent classifier 318 may determine the topical question operator 306 is most appropriate to process the user query statement. The user query statement may then be analyzed by an input collector 320 to identify input terms within the user query statement needed to process the statement using the topical question operator 306. A query translator 322 may be utilized to convert the identified inputs to a specific query for the data store format of the semantic network of trivia 314. Once converted, the query translator 322 may transmit the query to a natural language query engine 316 within the semantic network of trivia 314 to produce an output from the topical question operator 306. The output may then be translated to natural language using a natural language generator 324 and, subsequently presented to the user.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
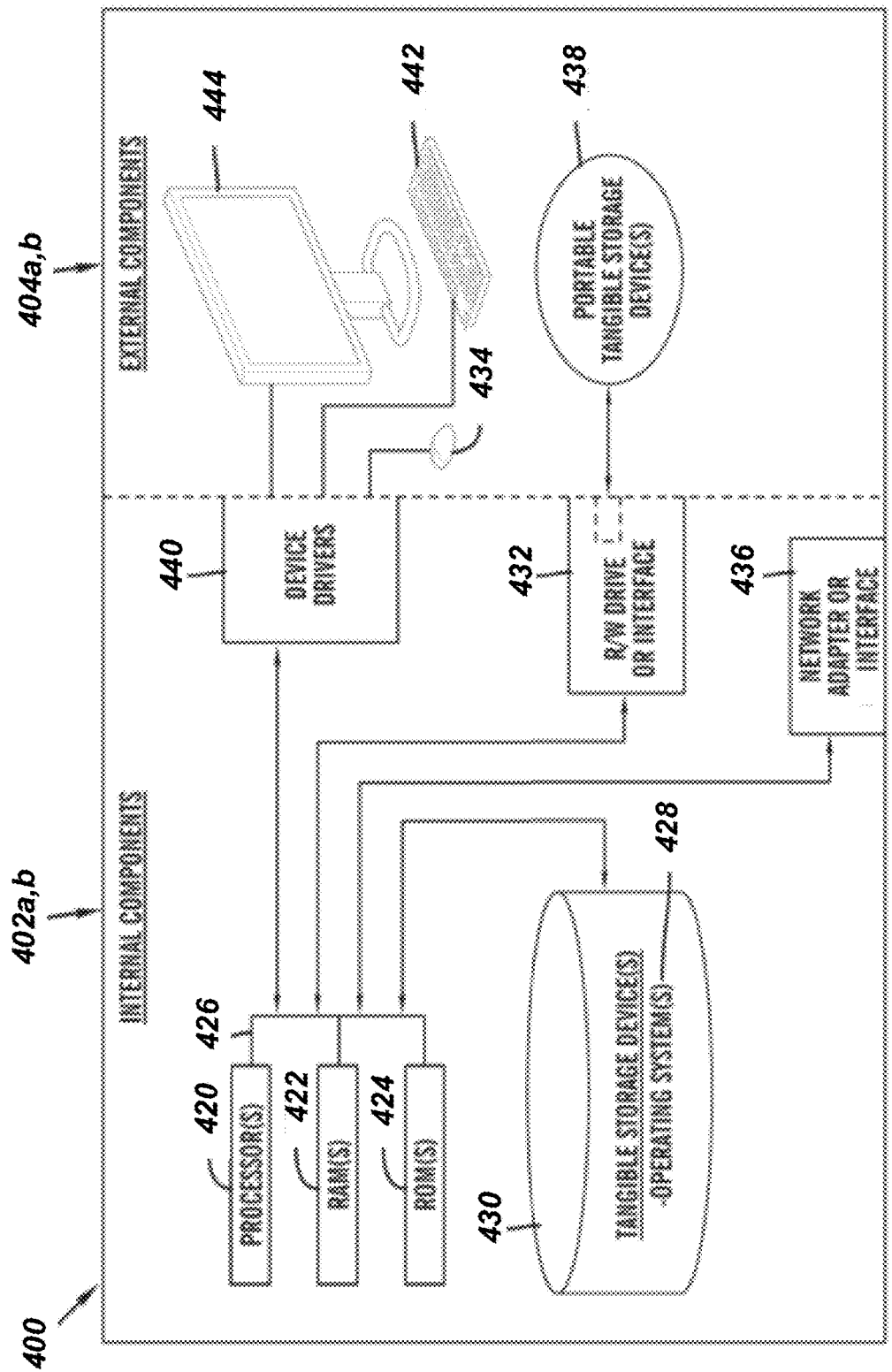
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the templated query operator program 110A in the client computing device 102 and the templated query operator program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the templated query operator program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the templated query operator program 110A in the client computing device 102 and the templated query operator program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the templated query operator program 110A in the client computing device 102 and the templated query operator program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
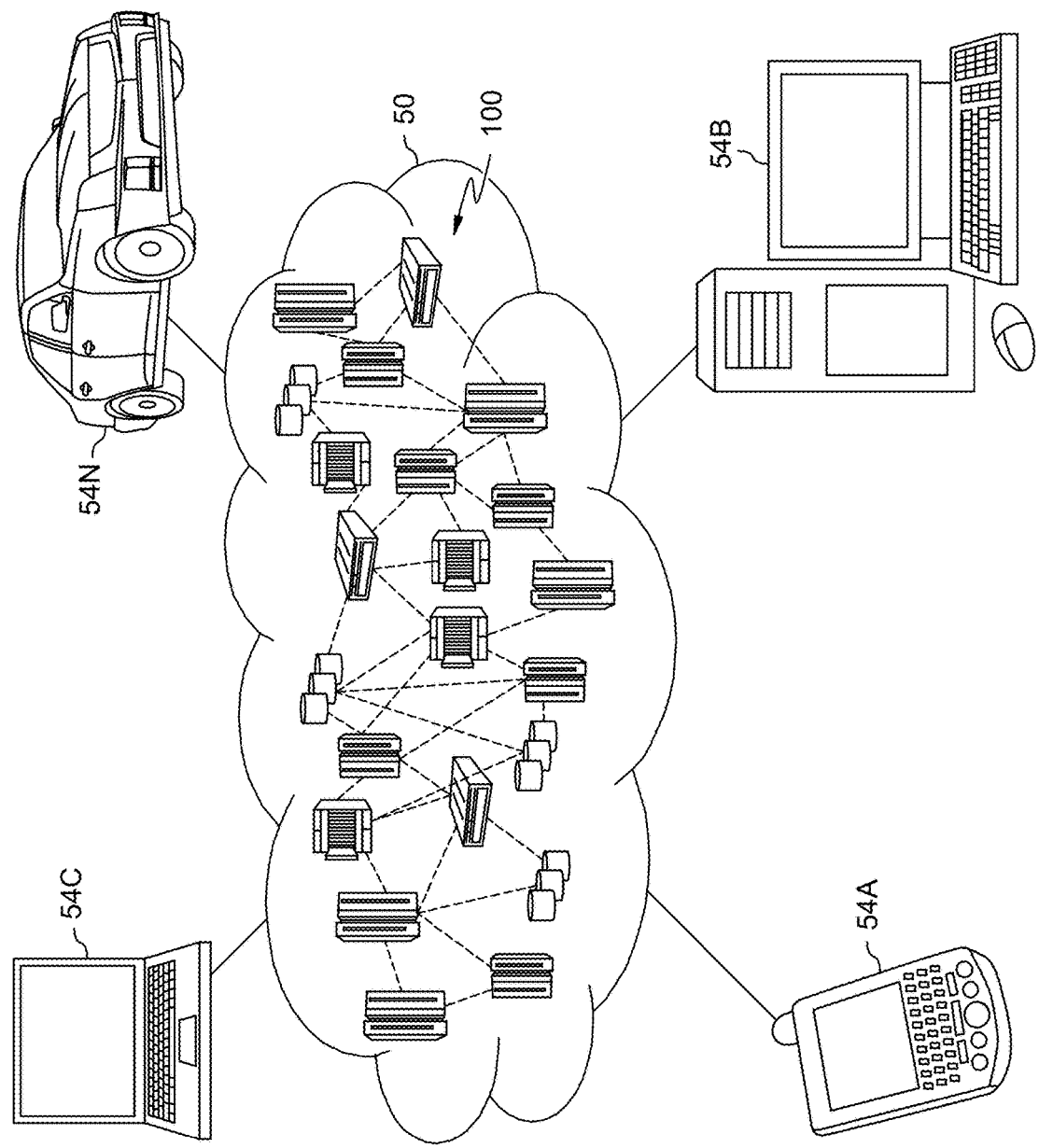
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
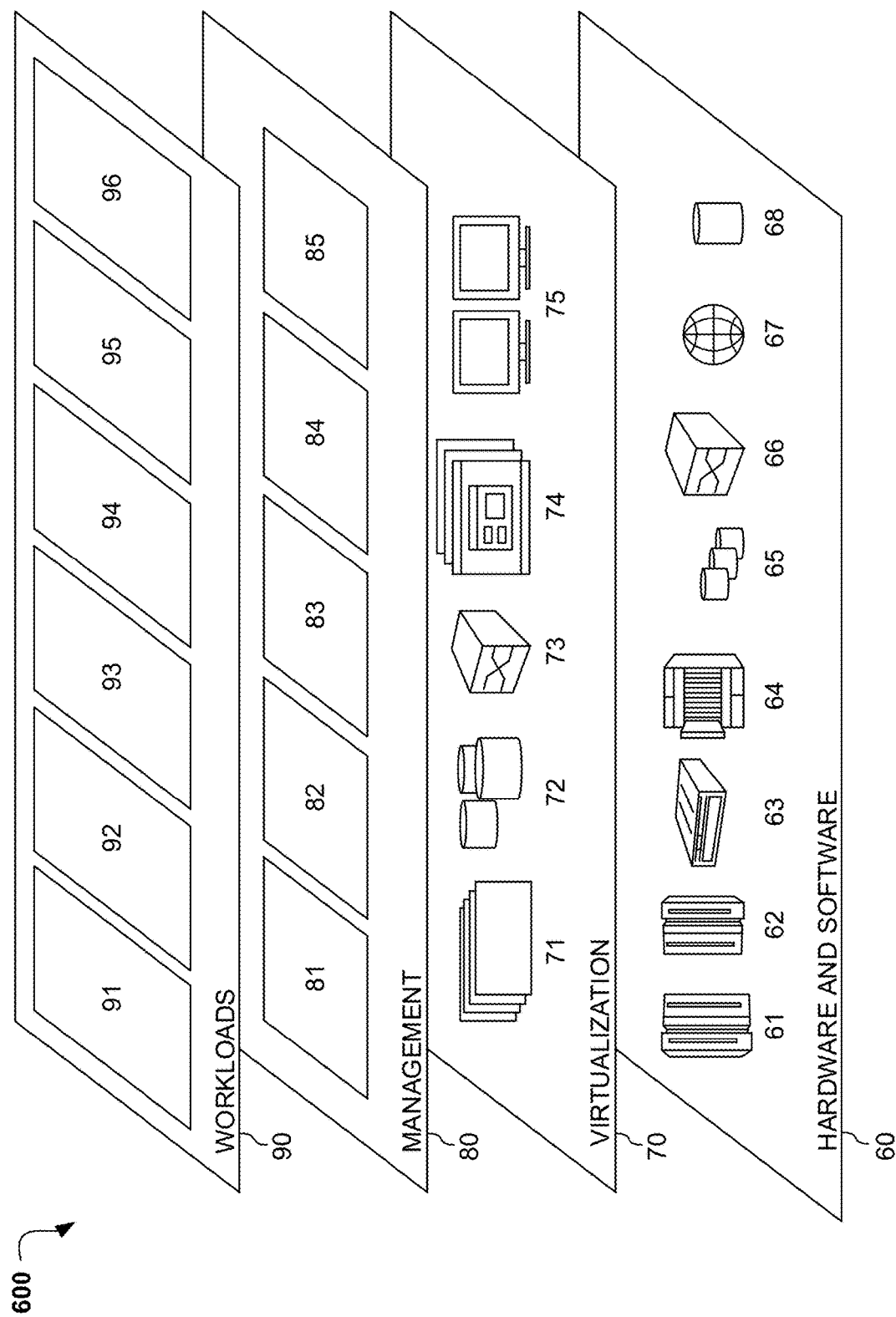
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and templated query operator importation 96. Templated query operator importation 96 may relate to utilizing templated query operators in the development and execution of a conversational system driven by a semantic network. More specifically, templated query operator importation 96 may allow a user query to be analyzed for variables in the user query that can be input to a templated query operator that may provide an accurate natural language response to the user query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for a conversational system driven by a semantic network with a library of templated query operators, the method comprising:
loading, by a processor, operators for the conversational system to the library of templated query operators, wherein the operators comprise problem solving operators and recommending operators, and wherein the problem solving operators invoke a root-cause analysis that identifies a common explanation, wherein the recommending operators recommend a product or service given specific user preferences, and wherein each loaded operator has a corresponding semantic network query module capable of consuming a semantic network with an ontology of concepts and relations, converting a natural language query with annotations of semantic roles to a data-share dependent query, and returning valid results;
receiving a natural language input from a user;
converting the received natural language input to a query statement on the semantic network, wherein the conversion comprises:
identifying an operator from the library to process the received natural language input; and
identifying one or more input terms for the identified operator within the received query;
generating one or more output terms based on processing the one or more identified input terms using the identified operator; and
generating a natural language response to the received query based on the one or more generated output terms.

2. The method of claim 1, wherein the operators are selected from a group consisting of a topical question operator, a hint operator, a recommender operator, and a common relations operator.

3. The method of claim 1, wherein each operator has a plurality of associated criteria, wherein the plurality of associated criteria are selected from a group consisting of one or more input terms, one or more output terms, one or more trigger phrases that invoke the operator by an intent classifier, one or more example operator entity mappings to train an input collector, and one or more examples of natural language generation from the one or more output terms.

4. The method of claim 1, wherein identifying an operator from the library comprises using an intent classifier to determine a user intent in the received query statement by applying semantic analysis.

5. The method of claim 1, wherein identifying the one or more input terms comprises using an input collector to identify the one or more input terms.

6. The method of claim 1, wherein generating the natural language response comprises using a natural language generator to analyze the one or more output terms.

7. The method of claim 1, further comprising:
presenting the generated natural language response to the user, wherein the generated natural language response is presented on as a plurality of text on a graphical user interface or as a plurality of human speech through a speaker using text-to-speech technology.

8. A computer system for a conversational system driven by a semantic network with a library of templated query operators, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
loading, by a processor, operators for the conversational system to the library of templated query operators, wherein the operators comprise problem solving operators and recommending operators, and wherein the problem solving operators invoke a root-cause analysis that identifies a common explanation, wherein the recommending operators recommend a product or service given specific user preferences, and wherein each loaded operator has a corresponding semantic network query module capable of consuming a semantic network with an ontology of concepts and relations, converting a natural language query with annotations of semantic roles to a data-share dependent query, and returning valid results;
receiving a natural language input from a user;
converting the received natural language input to a query statement on the semantic network, wherein the conversion comprises:
identifying an operator from the library to process the received natural language input; and
identifying one or more input terms for the identified operator within the received query;
generating one or more output terms based on processing the one or more identified input terms using the identified operator; and
generating a natural language response to the received query based on the one or more generated output terms.

9. The computer system of claim 8, wherein the operators are selected from a group consisting of a topical question operator, a hint operator, a recommender operator, and a common relations operator.

10. The computer system of claim 8, wherein each operator has a plurality of associated criteria, wherein the plurality of associated criteria are selected from a group consisting of one or more input terms, one or more output terms, one or more trigger phrases that invoke the operator by an intent classifier, one or more example operator entity mappings to train an input collector, and one or more examples of natural language generation from the one or more output terms.

11. The computer system of claim 8, wherein identifying an operator from the library comprises using an intent classifier to determine a user intent in the received query statement by applying semantic analysis.

12. The computer system of claim 8, wherein identifying the one or more input terms comprises using an input collector to identify the one or more input terms.

13. The computer system of claim 8, wherein generating the natural language response comprises using a natural language generator to analyze the one or more output terms.

14. The computer system of claim 8, further comprising:
presenting the generated natural language response to the user, wherein the generated natural language response is presented on as a plurality of text on a graphical user interface or as a plurality of human speech through a speaker using text-to-speech technology.

15. A computer program product for a conversational system driven by a semantic network with a library of templated query operators, the computer program product comprising:
one or more computer-readable tangible storage media and program instructions stored on at least one of the one or more tangible storage media, the program instructions executable by a processor of a computer to perform a method, the method comprising:
loading, by a processor, operators for the conversational system to the library of templated query operators, wherein the operators comprise problem solving operators and recommending operators, and wherein the problem solving operators invoke a root-cause analysis that identifies a common explanation, wherein the recommending operators recommend a product or service given specific user preferences, and wherein each loaded operator has a corresponding semantic network query module capable of consuming a semantic network with an ontology of concepts and relations, converting a natural language query with annotations of semantic roles to a data-share dependent query, and returning valid results;
receiving a natural language input from a user;
converting the received natural language input to a query statement on the semantic network, wherein the conversion comprises:
identifying an operator from the library to process the received natural language input; and
identifying one or more input terms for the identified operator within the received query;
generating one or more output terms based on processing the one or more identified input terms using the identified operator; and
generating a natural language response to the received query based on the one or more generated output terms.

16. The computer program product of claim 15, wherein the operators are selected from a group consisting of a topical question operator, a hint operator, a recommender operator, and a common relations operator.

17. The computer program product of claim 15, wherein each operator has a plurality of associated criteria, wherein the plurality of associated criteria are selected from a group consisting of one or more input terms, one or more output terms, one or more trigger phrases that invoke the operator by an intent classifier, one or more example operator entity mappings to train an input collector, and one or more examples of natural language generation from the one or more output terms.

18. The computer program product of claim 15, wherein identifying an operator from the library comprises using an intent classifier to determine a user intent in the received query statement by applying semantic analysis.

19. The computer program product of claim 15, wherein identifying the one or more input terms comprises using an input collector to identify the one or more input terms.

20. The computer program product of claim 15, wherein generating the natural language response comprises using a natural language generator to analyze the one or more output terms.

\* \* \* \* \*